(12) United States Patent
McIntyre et al.

(10) Patent No.: US 9,122,423 B2
(45) Date of Patent: Sep. 1, 2015

(54) METHODS, SYSTEMS AND TOOLS FOR PROGRAMMING TIRE PRESSURE MONITORING SENSORS

(71) Applicant: Continental Automotive Systems, Inc., Auburn Hills, MI (US)

(72) Inventors: Matthew D McIntyre, New Baltimore, MI (US); Jean Christophe Deniau, Fenton, MI (US); Brian J Farrell, Troy, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 182 days.

(21) Appl. No.: 13/712,143

(22) Filed: Dec. 12, 2012

(65) Prior Publication Data

US 2014/0165026 A1  Jun. 12, 2014

(51) Int. Cl.
*G06F 9/44* (2006.01)
*B60C 23/06* (2006.01)
*B60R 25/10* (2013.01)
*B60C 23/00* (2006.01)
*G01M 17/02* (2006.01)
*G06F 9/445* (2006.01)
*G01M 17/013* (2006.01)
*B60C 23/04* (2006.01)

(52) U.S. Cl.
CPC .............. *G06F 8/10* (2013.01); *B60C 23/0471* (2013.01); *B60C 23/0479* (2013.01); *G06F 8/65* (2013.01); *B60C 23/0408* (2013.01); *G01M 17/013* (2013.01); *G01M 17/02* (2013.01)

(58) Field of Classification Search
CPC .............. G06F 8/10; G06F 8/60; G06F 8/61; G06F 8/65; B60C 23/0408; B60C 23/0471; B60C 23/0479; G01M 17/013; G01M 17/02
USPC ................... 717/168–178; 73/146; 116/34 R; 340/426.33, 442
See application file for complete search history.

(56) References Cited

U.S. PATENT DOCUMENTS

| | | | |
|---|---|---|---|
| 7,088,226 B2 * | 8/2006 | McClelland et al. | 340/442 |
| 7,231,274 B2 * | 6/2007 | Moulds et al. | 700/115 |
| 7,688,192 B2 * | 3/2010 | Kenny et al. | 340/447 |

(Continued)

FOREIGN PATENT DOCUMENTS

| | | |
|---|---|---|
| EP | 1659374 A1 | 5/2006 |
| WO | 2011061455 A1 | 5/2011 |

OTHER PUBLICATIONS

International Search Report and the Written Opinion of the International Searching Authority dated Feb. 21, 2014, PCT/US2013/073847.

*Primary Examiner* — Qing Chen (57) ABSTRACT

The present invention relates to methods, systems and tools for programming tire pressure monitoring sensors based upon ascertained vehicle identification numbers. In one aspect, the present invention provides a method of programming a tire pressure monitoring sensor of a vehicle wheel unit. The method includes obtaining identification information of a vehicle with a programming tool for a tire pressure monitoring sensor. The method further includes comparing the identification information with a database of identification information to determine a program software that is compatible with the vehicle. The method further includes programming the tire pressure monitoring sensor with the program software.

31 Claims, 9 Drawing Sheets

(56) References Cited

U.S. PATENT DOCUMENTS

| | | | |
|---|---|---|---|
| 8,186,208 B2* | 5/2012 | Matsumura | 73/146.4 |
| 8,299,908 B2* | 10/2012 | Isomura et al. | 340/442 |
| 8,692,661 B2* | 4/2014 | Deniau et al. | 340/442 |
| 9,050,862 B2* | 6/2015 | Mouchet | 1/1 |
| 2003/0055812 A1* | 3/2003 | Williams et al. | 707/1 |
| 2004/0183665 A1* | 9/2004 | McClelland et al. | 340/445 |
| 2005/0216903 A1* | 9/2005 | Schaefer | 717/168 |
| 2006/0253217 A1* | 11/2006 | Moulds et al. | 700/115 |
| 2007/0032965 A1* | 2/2007 | McClanahan et al. | 702/32 |
| 2008/0117036 A1 | 5/2008 | Kenny et al. | |
| 2008/0117037 A1* | 5/2008 | Kenny et al. | 340/442 |
| 2009/0033478 A1* | 2/2009 | Deniau et al. | 340/442 |
| 2009/0199629 A1* | 8/2009 | Matsumura | 73/146.4 |
| 2009/0267751 A1* | 10/2009 | Wittliff et al. | 340/442 |
| 2009/0276115 A1* | 11/2009 | Chen | 701/32 |
| 2010/0302063 A1* | 12/2010 | Isomura et al. | 340/870.16 |
| 2011/0093160 A1* | 4/2011 | Ramseyer | 701/33 |
| 2012/0041968 A1* | 2/2012 | Zak et al. | 707/769 |
| 2012/0119895 A1* | 5/2012 | Deniau et al. | 340/442 |
| 2012/0259884 A1* | 10/2012 | Donehue | 707/769 |
| 2013/0061456 A1* | 3/2013 | Lefaure et al. | 29/595 |
| 2013/0106596 A1* | 5/2013 | Mouchet | 340/445 |
| 2013/0282231 A1* | 10/2013 | Farr et al. | 701/34.4 |

* cited by examiner

METHODS, SYSTEMS AND TOOLS FOR PROGRAMMING TIRE PRESSURE MONITORING SENSORS

FIELD OF THE INVENTION

The present invention relates to methods, systems and tools for programming tire pressure monitoring sensors based upon ascertained vehicle identification numbers.

BACKGROUND OF THE INVENTION

Commercial and non-commercial vehicles now include tire pressure monitoring systems (TPMS) which include a central module, integrated or in communication with an electronic control unit of the vehicle, and tire pressure monitoring sensors for each of the vehicle wheel units. In general, the TPMS sensors monitor tire pressure within a respective tire and transmits a wireless signal to the central module which is indicative of tire pressure. Should the sensed pressure be outside of an acceptable range or a substantial change in tire pressure occur, an alarm is generated and transmitted to the user of the vehicle.

Over time, TPMS sensors may require replacement by service technicians due to damage, depleted battery or otherwise. In today's TPMS market, particularly the aftermarket, certain manufacturers offer TPMS sensors that can be flash programmed by a service technician with suitable operating software for a particular make, model and year of a vehicle. Unfortunately, this requires the technician to accurately determine the make, model and year of the vehicle and also laboriously scroll through a programming tool, or device, to select the determined make, model and year of the vehicle. Should the technician incorrectly identify the vehicle or unintentionally select the wrong program software, one or more, or even all, of the sensors may be incorrectly programmed and rendered unusable. Once the technician realized their mistake, they must again scroll through the programming tool to select the correct vehicle make, model and year, and once again program all of the sensors. Whether the technician accurately identifies the vehicle, or not, time is wasted through this laborious process.

SUMMARY OF THE INVENTION

The present invention provides improved methods, systems and devices for the programming of programmable TPMS sensors. The features of the present invention are predicated, in part, through the utilization of vehicle identification codes for positively identifying vehicles and programming replacement TPMS sensors with suitable program software. Through positive determination of vehicles and reduction in programming steps, the duration of programming time and user error is dramatically reduced.

In a first aspect, the present invention provides a method of programming a tire pressure monitoring sensor of a vehicle wheel unit. The method includes obtaining identification information of a vehicle with a programming tool for a tire pressure monitoring sensor. The method further includes comparing the identification information with a database of identification information to determine a program software that is compatible with the vehicle. The method further includes programming the tire pressure monitoring sensor with the program software.

In another aspect, the present invention provides a programming system for a tire pressure monitoring sensor. The system includes a database of program software stored on a digital memory device, each of the program software includes operation commands and transmission protocols for a tire pressure monitoring sensor. The system further includes a vehicle identification code reader for obtaining an identification code of a particular vehicle. The method further includes software instructions that utilizes the identification code to determine a suitable program software for the particular vehicle. The method further includes a programming tool for programming a tire pressure monitoring sensor with the suitable program software.

In another aspect, the present invention provides a hand-held programming tool for programming tire pressure monitoring sensors. The programming tool includes a vehicle identification code reader for obtaining a vehicle identification code of a particular vehicle. The programming tool further includes a database of program software for tire pressure monitoring sensors stored on a digital memory device. The programming tool further includes a control unit including operating instructions for utilizing the identification code to determine a suitable program software for the particular vehicle. The programming tool further includes a programming device for programming a tire pressure monitoring sensor with the suitable program software.

In another aspect, the present invention provides a computer-readable memory device storing computer program instructions which when executed by a computer comprising at least one processor results in: i) obtaining identification information of a particular vehicle; ii) comparing the identification information with a database of vehicle identification information to determine a program software that is compatible with the particular vehicle; and iii) programming a programmable tire pressure monitoring sensor with the program software.

These and other features of the present invention can be best understood from the following specification and drawings, the following of which is a brief description.

DETAILED DESCRIPTION OF THE INVENTION

Referring to FIGS. 1-4, several exemplary embodiments of a programming system 10, for programming one or more tire pressure monitoring (TPM) sensors 12 of a tire pressure monitoring system (TPMS) 14, is shown. In general, the programming system 10 includes a programming tool 16 that includes a recorder 18 for obtaining, recording, receiving and/or imputing identification information of a vehicle such as an identification code 20, more commonly referred to as a vehicle identification number or VIN, of a vehicle 22. A control unit 24 of the programming tool 16 compares the identification information of the vehicle 22 to a database of identification vehicle identification information, such as a database of identification codes 26, to determine a specific make, model and year of the vehicle 22. With this specific vehicle information determined, the control unit 24 selects a program software from a database of TPM sensor program software 28 that is suitable for use with the TPMS 14. The control unit 24 then programs a memory unit of a TPM sensor 12 with the suitable program software, through a programming device 30.

After programming, the TPM sensor 12 communicates with a control module 32 of the TPMS 14 to provide continuous information, particularly air pressure, of a wheel unit 34. The suitable program software installed onto the memory device of the TPM sensor 12 includes operation commands for indicating how the TPM sensor functions and communications protocols for indicating how the TPM sensor communicates with the TPMS 14. The operation commands and/or communication protocols are often dictated by the original equipment manufacturer of the vehicle, TPMS or both. For example, such operation commands may include when the sensor records data, if or how the data is analyzed, calibrated or adjusted, when the sensor transmits signals or otherwise. Examples of such communication protocols includes number of frames per transmission, order of frames or data within the transmission, frequency of the transmission or otherwise.

The programming tool 16 includes various electrical components for operation of the tool, according to the teachings of the present invention. For example, referring to the exemplary embodiments shown in FIGS. 2-4, the programming tool 16 includes a central processing unit 36 and software disposed on one or more computer-readable memory devices 38. In one exemplary embodiment, it is contemplated that the central processing unit 36 and one or more computer readable memory devices 38 are integrated into the control unit 24 within the programming tool 16. It is contemplated, as described herein or otherwise, that additional electrical components, or otherwise, may be included with the control unit 24 or the programming tool 16 to achieve the specific functions, as described herein or otherwise.

In one exemplary embodiment, programming tool 16 further includes a user interface to initiate commands of the programming tool operation software stored on the computer-readable memory device 38. In several configurations, referring to FIGS. 5-7, the user interface comprises display screen 54, buttons 48, 50, 52, 56 and/or keypad 62. It is further contemplated that operation commands may be automatically initiated, such as when the programming tool 16 is connected to another electrical device, as described herein or otherwise. Exemplary commends include, without limitation: i) forming connections with other electrical devices including TPM sensors, vehicles, computers or otherwise, ii) downloading vehicle or sensor information from a vehicle, iii) uploading vehicle sensor information to a vehicle, iv) recording vehicle identification information, v) selecting suitable program software from a database of TPM sensor program software 28, vi) programming a TPM sensor with selected program software, or vii) for performing other method or operational steps as described herein.

As previously mentioned, the programming tool 16 further includes a vehicle identification code recorder 18 for obtaining, analyzing, deciphering and/or recording information pertaining to an identification code of a vehicle 22. It should be appreciated that identification codes of a vehicle 22, as used herein, includes codes, symbols, graphical or digital representations or otherwise that can be used to uniquely identify a make, model and/or year of a vehicle. In one exemplary embodiment, the vehicle identification code recorder 18 is in communication with a digital memory device, such as memory device 38 or otherwise, for storing the recorded identification code. As such, it is contemplated that the control unit 24 is in communication with a memory device having the recorded vehicle identification code.

Figure 2:
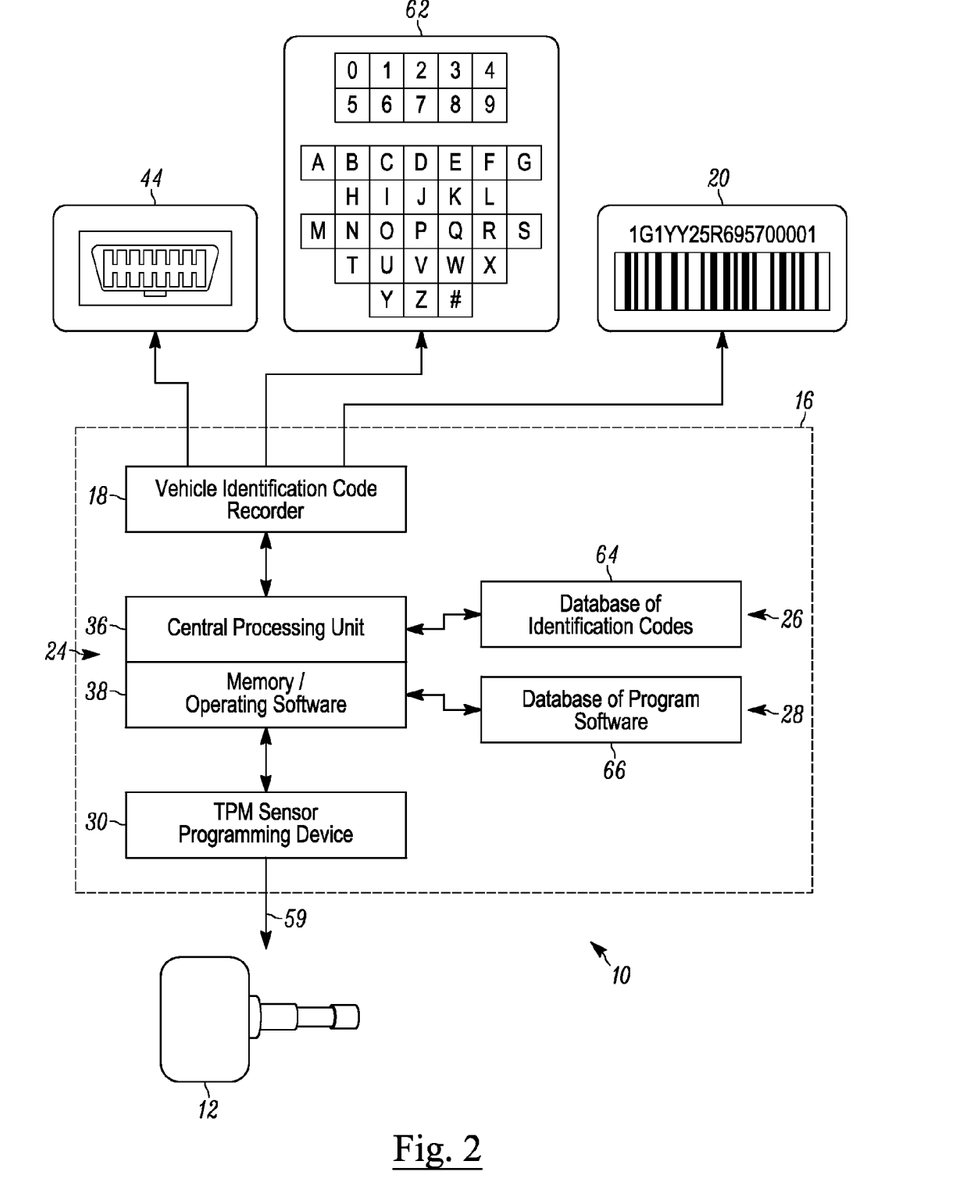
FIG. 2 illustrates a schematic view of an exemplary programming system for a tire pressure monitoring sensor according to the teachings of the present invention.
Figure 3:
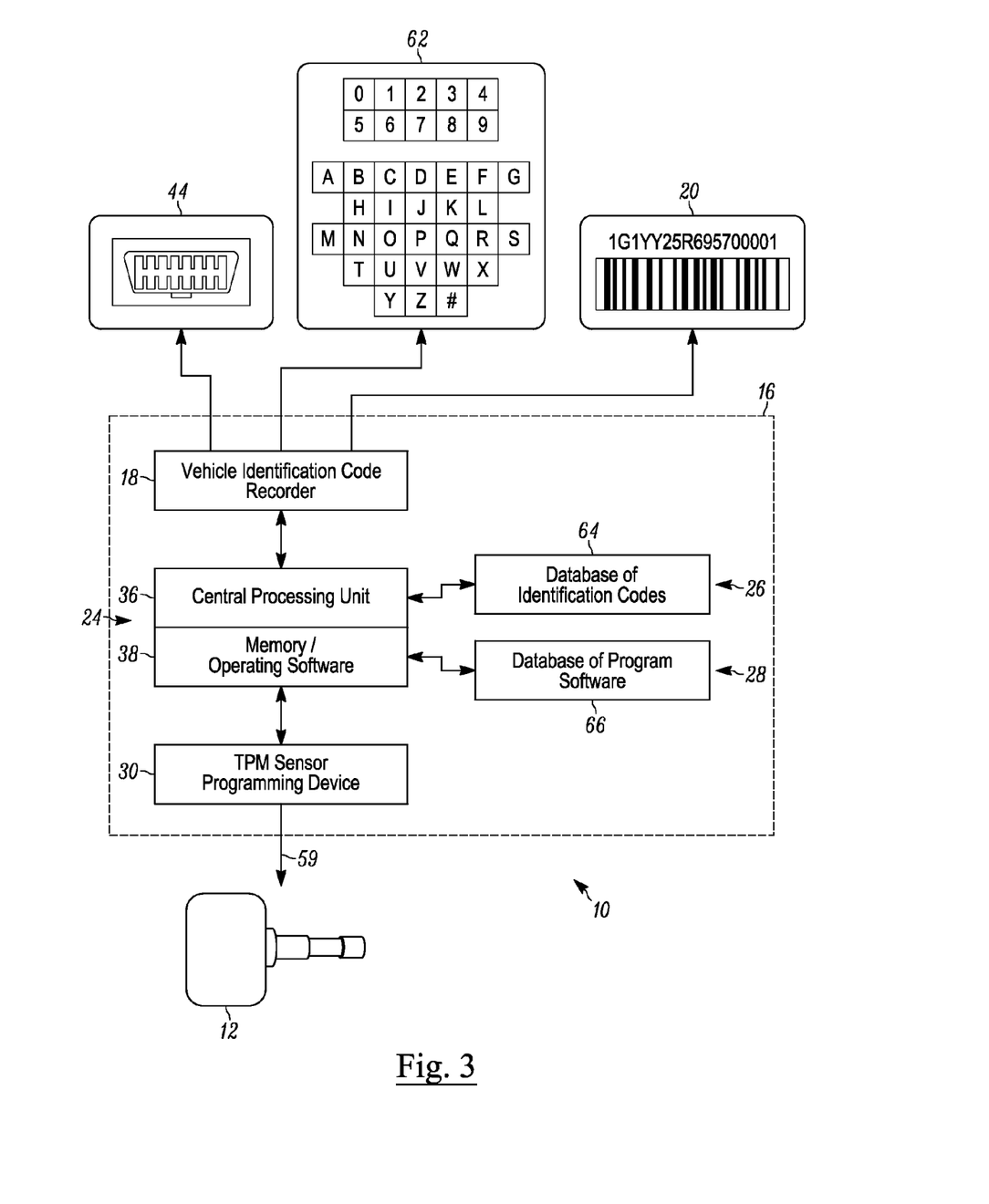
FIG. 3 illustrates a schematic view of another exemplary programming system for a tire pressure monitoring sensor according to the teachings of the present invention.

In one exemplary embodiment, referring to FIGS. 2 and 3, the vehicle identification code recorder 18 is integrated with the programming tool 16. In this configuration, the vehicle identification code recorder 18 is integrated with or within a housing 40, or fixedly attached to the programming tool through a suitable attachment, such as through mechanical fasteners, or otherwise. In another exemplary embodiment, referring to FIG. 4, the vehicle identification code recorder 18 is formed separately from, but in communication with, the programming tool 16. In one configuration, the programming tool 16 includes a suitable electrical connector 42 for forming a communication link with the vehicle identification code recorder 18. However, in another configuration, the vehicle identification code recorder 18 is in wireless communication with the programming tool 16, through suitable software and hardware, which may be combined with the control unit 24, or otherwise. In any regard, in one exemplary embodiment, it is contemplated that the control unit 24 of the programming tool 16 controls all or a portion of the operation of the vehicle identification code recorder 18.

Figure 1:
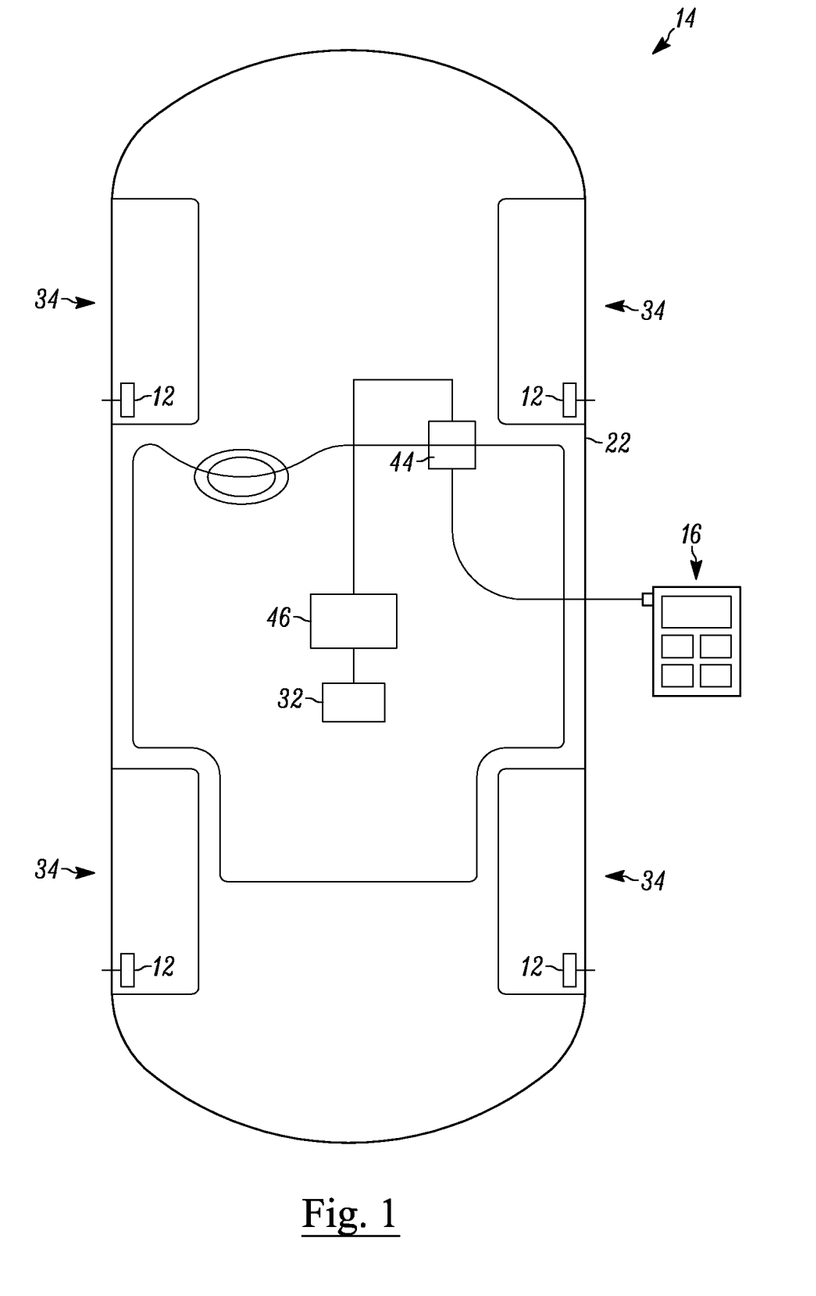
FIG. 1 illustrates a top schematic view of exemplary embodiment of a programming system and hand-held programming tool for a TPMS sensor according to the teachings of the presenting invention.
Figure 5:
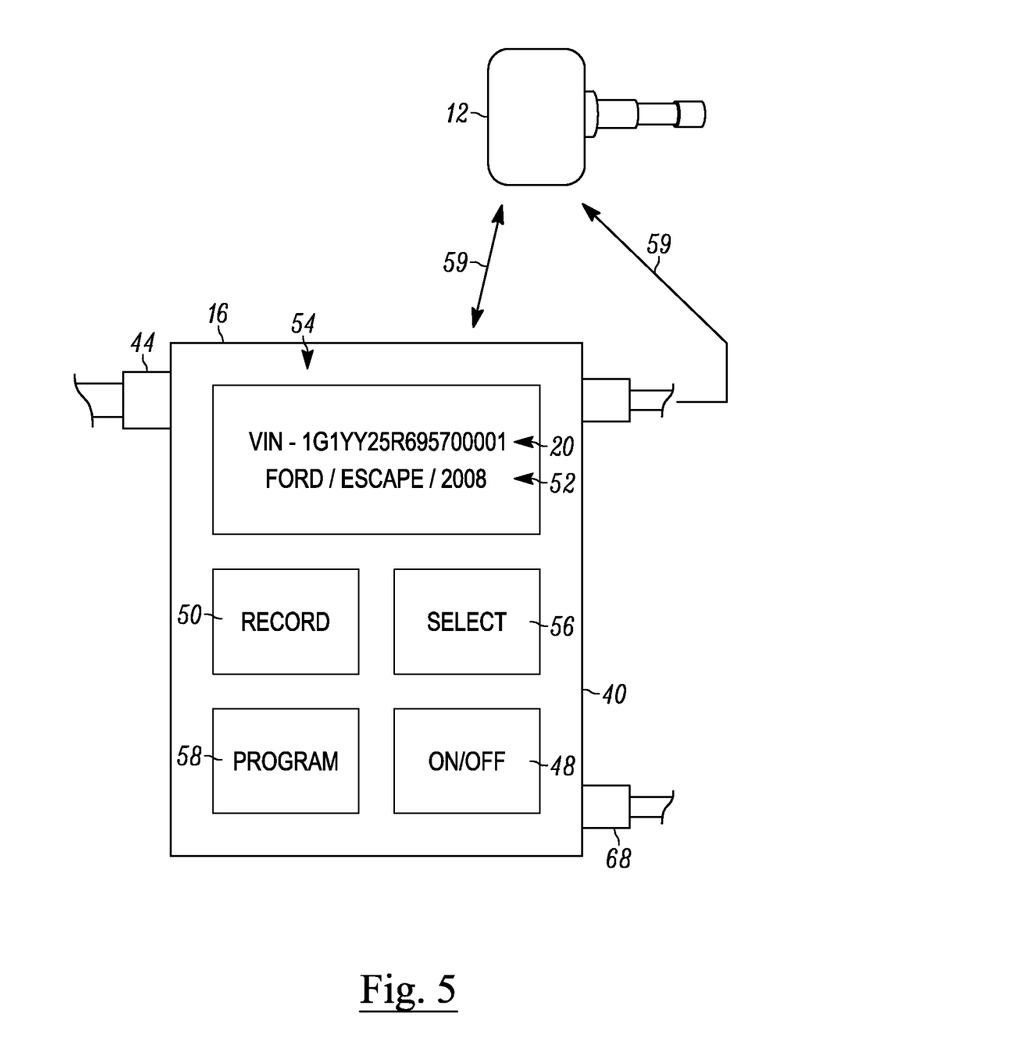
FIG. 5 illustrates a top elevational view of an exemplary embodiment of a hand-held programming tool for a TPMS sensor according to the teachings of the present invention.

In greater detail, referring to FIGS. 1 and 5, a first exemplary configuration of a programming tool 16 having an integrated vehicle identification code recorder 18 is shown. In this configuration, the identification code recorder 18 includes an on-board diagnostic connector 44, e.g., OBD, OBD-II, EOBD, EOBD-2, JOBD, ADR or otherwise. The control unit 24 of the programming tool 16 communicates with an on-board diagnostic system 46 of the vehicle 22 to obtain information pertaining to the health of the vehicle. This information includes a vehicle identification number, i.e. identification code 20, which is used to determine the specific make, model and year of the vehicle 22. The vehicle identification code recorder 18 analyzes, via control unit 24, the signal received from the on-board diagnostic system 46 to selectively obtain and store the identification code 20. The vehicle identification number or code is then compared with a database of vehicle identification code, again via control unit 24, to determine the specific make, model and year of the vehicle. The process of obtaining information from the on-board diagnostic system 46, selecting the vehicle identification number or code, saving the vehicle identification code and comparing the code to the database of vehicle identification codes is achieved through the central processing unit 24 and operating software stored on the computer-readable memory device 38 of the programming tool 16.

In an exemplary operational sequence of the exemplary configuration shown in FIG. 5, a user first presses an 'On/Off' button 48 to turn on the programming tool 16. To obtain the identification code 20 the user then presses the 'Record' button 50 which sends a signal through on-board diagnostic connector 44 to the on-board diagnostic system 46 to generate a return signal including the identification code. The identification code 20 is then compared to the database of vehicle identification codes 26 and the identification code 20, as well as the vehicle make, model and year 52, are displayed on a display screen 54 of the programming tool 16. A user then selects or approves of the information displayed by the programming tool 16 by pressing the 'Select' button 56. The user then places a TPM sensor 12 in communication with the programming tool 16, via wired or wireless connection 59, and presses the 'Program' button 58 to beginning programming the TPM sensor 12. It should be appreciated that multiple TPM sensors 12 can be programmed simultaneously.

Figure 6:
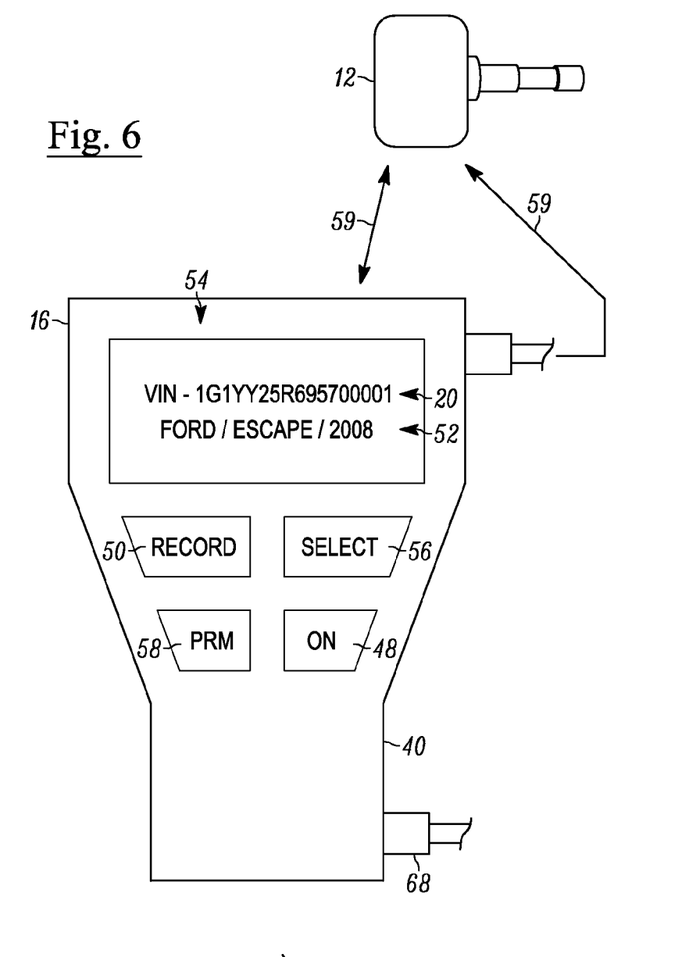
FIG. 6 illustrates a top elevational view of another exemplary embodiment of a hand-held programming tool for a TPMS sensor according to the teachings of the present invention.
Figure 6A:
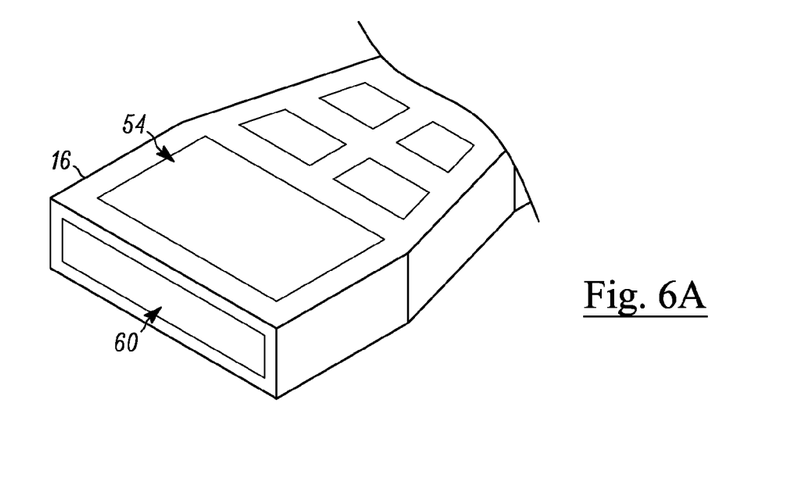
FIG. 6A illustrates a perspective view of the hand-held programming tool shown in FIG. 6.

Referring to FIGS. 6 and 6A, a second exemplary configuration of a programming tool 16 having an integrated vehicle identification code recorder 18 is shown. In this configuration, the identification code recorder 18 includes a scanner 60 configured for reading scanable identification codes, such as bar codes, 2-D matrix bar codes or otherwise. The scanner 60 may comprise any suitable code scanner including bar code wands, laser scanners, CCD readers and camera-based readers, or otherwise. In one preferred configuration, the type of scanner 60 is compatible with the type of code displayed on the vehicle 22.

In the configuration shown in FIGS. 6 and 6A, the scanner 60 is integrated with the programming tool 16 to form a single unitary body. In an alternate configuration, such as in FIG. 4, the scanner 60 comprises a separate unit that is in communication with the programming tool 16. In this alternate configuration, the scanner 60 is connected through a wired or wireless communication link. In either configuration, the control unit 24 of the programming tool 16 causes the scanner 60 to scan or read the scannable code and transmit a return signal to the control unit pertaining to the scan results. In most current vehicle configurations, the scannable identification code 20 of a vehicle 22 comprises a bar code that is displayed on a dashboard or door of the vehicle.

In an exemplary operational sequence of the exemplary configuration shown in FIG. 6, a user first presses an 'On/Off' button 48 to turn on the programming tool 16. To obtain the identification code 20 the user then presses the 'Record' button 50 which sends a signal to the scanner 60 to read or capture the image of the vehicle identification code 20. The captured identification code 20 is then transferred back to the control unit 24 of the programming tool 16 and is then compared to the database of vehicle identification codes 26 and the identification code 20, as well as the vehicle make, model and year 52, are displayed on a display screen 54 of the programming tool 16. A user then selects or approves of the information displayed by the programming tool 16 by pressing the 'Select' button 56. The user then places a TPM sensor 12 in communication with the programming tool 16, via wired or wireless connection 59, and presses the 'Program' button 58 to beginning programming the TPM sensor 12. It should be appreciated that multiple TPM sensors 12 can be programmed simultaneously.

Figure 4:
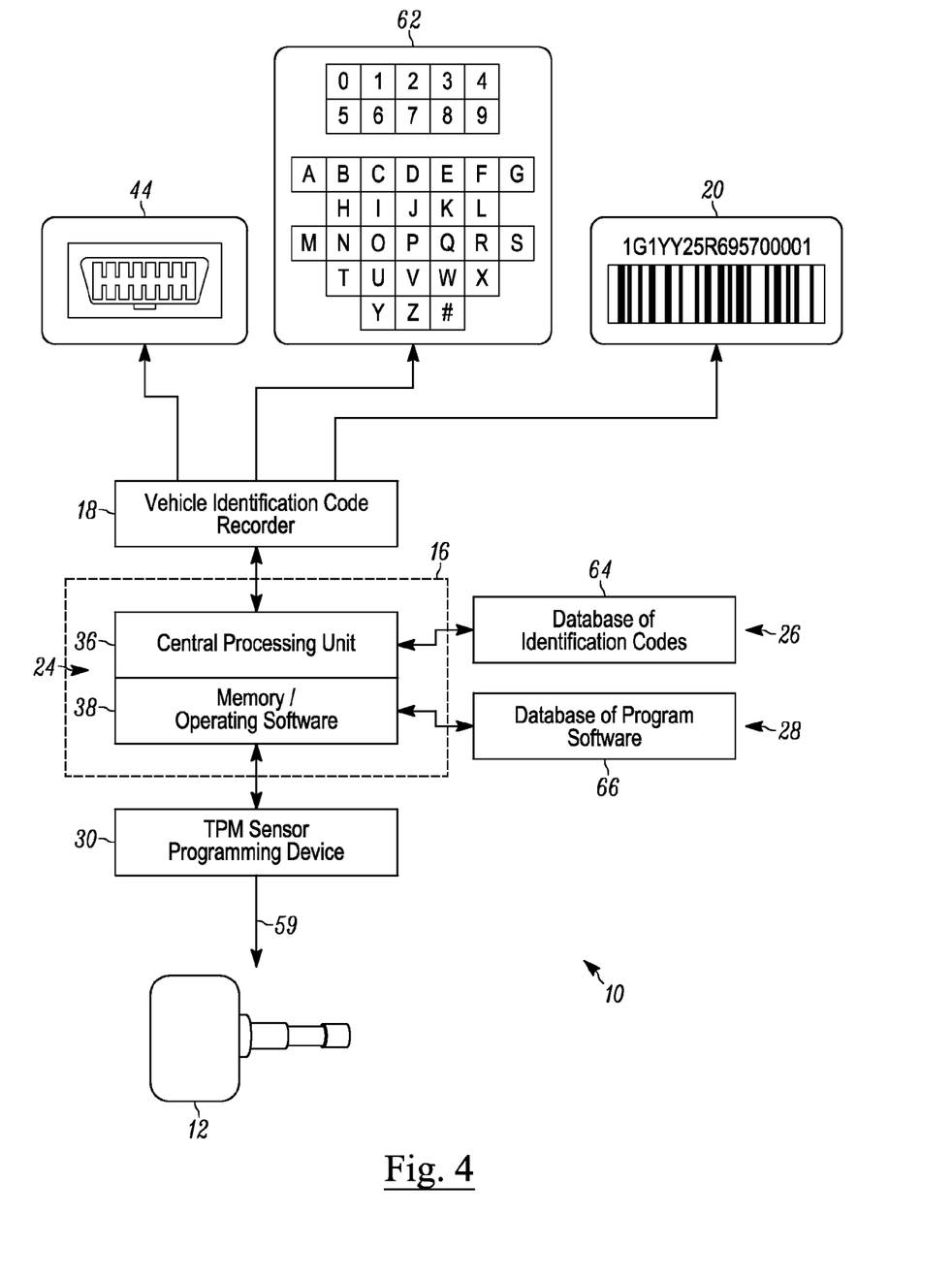
FIG. 4 illustrates a schematic view of another exemplary programming system for a tire pressure monitoring sensor according to the teachings of the present invention.
Figure 7:
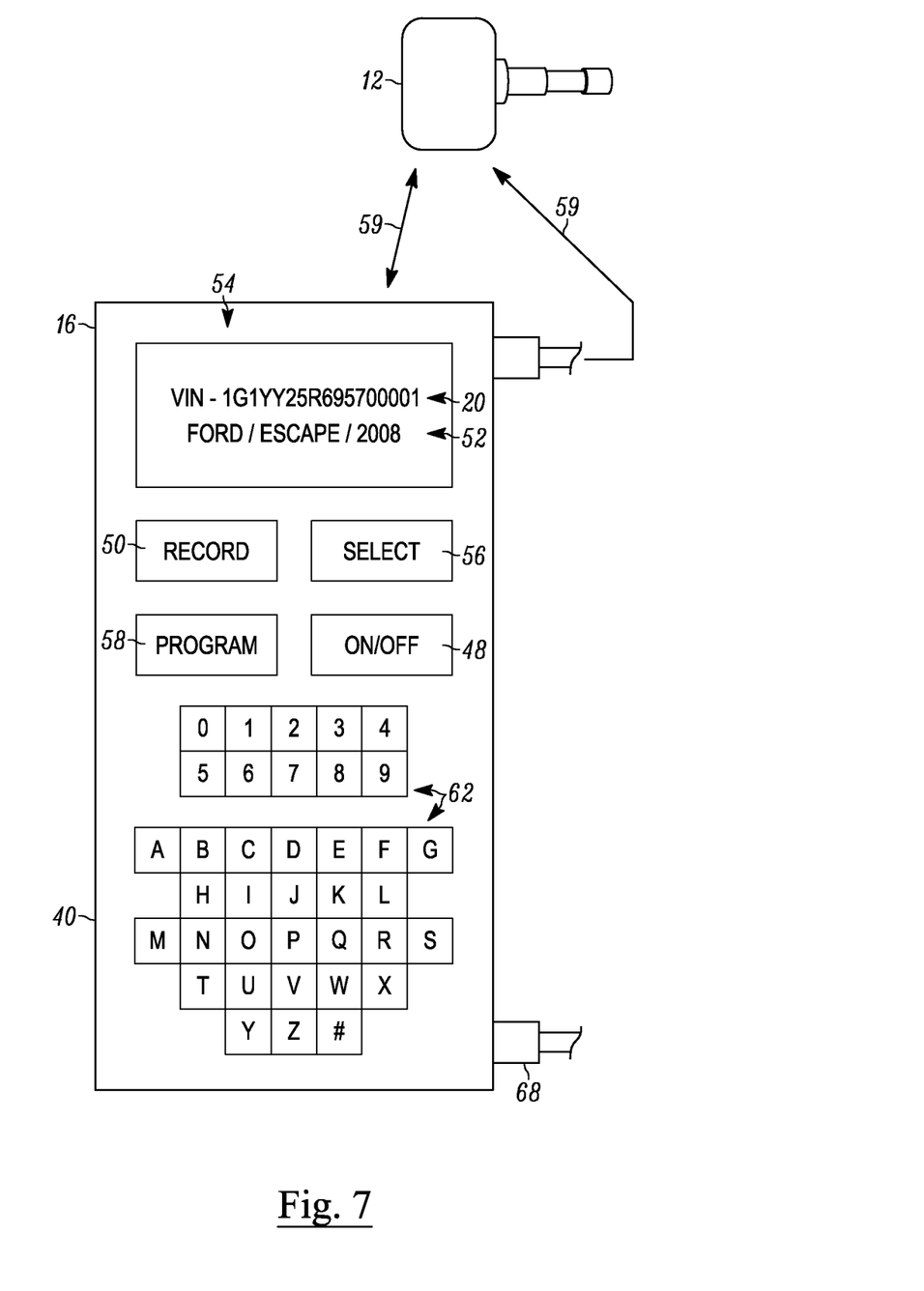
FIG. 7 illustrates a top elevational view of another exemplary embodiment of a hand-held programming tool for a TPMS sensor according to the teachings of the present invention.

Referring to FIG. 7, a third exemplary configuration of a programming tool 16 having an integrated vehicle identification code recorder 18 is shown. In this configuration, the identification code recorder 18 includes a keypad 62 for manually entering into the programming tool 16 an identification code 20 of a vehicle 22. The keypad 62 is in communication with the control unit 24 of the programming tool 16. In this particular configuration, the keypad 62 is integrated with the programming tool 16. However, in an alternate configuration, such as shown in FIG. 4, the keypad 62 may comprise a separate component that is in communication with the programming tool 16 through a wired or wireless connection 59.

In an exemplary operational sequence of the exemplary configuration shown in FIG. 7, a user first presses an 'On/Off' button 48 to turn on the programming tool 16. To obtain the identification code 20 the user enters the vehicle code into the programming tool 16 using the keypad 62, which is immediately displayed on a display screen 54. The user then presses the 'Record' button 50 which compares the entered vehicle code to the database of vehicle identification codes 26. The vehicle make, model and year are then displayed on a display screen 54 of the programming tool 16. A user then selects or approves of the information displayed by the programming tool 16 by pressing the 'Select' button 56. The user then places a TPM sensor 12 in communication with the programming tool 16, via wired or wireless connection 59, and presses the 'Program' button 58 to beginning programming the TPM sensor 12. It should be appreciated that multiple TPM sensors 12 can be programmed simultaneously.

As mentioned, the programming tool includes a TPMS sensor programming device 30 for programming TPMS sensors 12 with the selected program software. The programming device 30 is configured to transfer operating software to the TPMS sensor through suitable means such as flash programming or otherwise. In one exemplary embodiment, as shown in FIGS. 2 and 3, the programming device 30 is integrally formed with the programming tool 16. In another exemplary embodiment, as shown in FIG. 4, the programming device 30 is separately formed from the programming tool 16 and is connected through a communication link, such as a data transfer cable or otherwise. It should be appreciated that computer-readable memory device includes instructions for causing the transfer of program software to one or more TPMS sensors 12 according to the type and configuration of data transfer. It should be further appreciated that the programming tool 16 includes suitable electronic components, such as wireless transmission devices, antennas, electoral connectors or otherwise for facilitating transfer of the data.

As mentioned, the programming system 10 includes a database of identification codes 26 and a database of program software 28. The databases are in communication with the control unit 24 of the programming tool 16 for facilitating in selection and transfer of a suitable program software. In one exemplary embodiment, the database of identification codes 26 is stored on a first memory device 64 and the database of program software 28 is stored on a second memory device 66. In another exemplary embodiment, the database of the identification codes 26 and database of program software 28 are integrated and/or stored on a single memory device. In yet another exemplary embodiment, the database of identification codes 26 are stored on a first memory device and the database of program software is stored on a plurality of memory device. In this configuration, it is contemplated that the programming tool connects to original equipment manufacturers of the TPMS sensors or system and download the most recent version of suitable software. Accordingly, each manufacture may have a separate memory device including one or more program software. In any regard, it is contemplated that the database of identification codes 26 and the database of program software 28 are periodically updated.

According, as shown in FIGS. 4-6, it is contemplated that the first memory device, second memory device, single or plurality of memory devices are connected to data transfer port 68 for connection to another memory storage device, Internet, network or otherwise.

Figure 8:
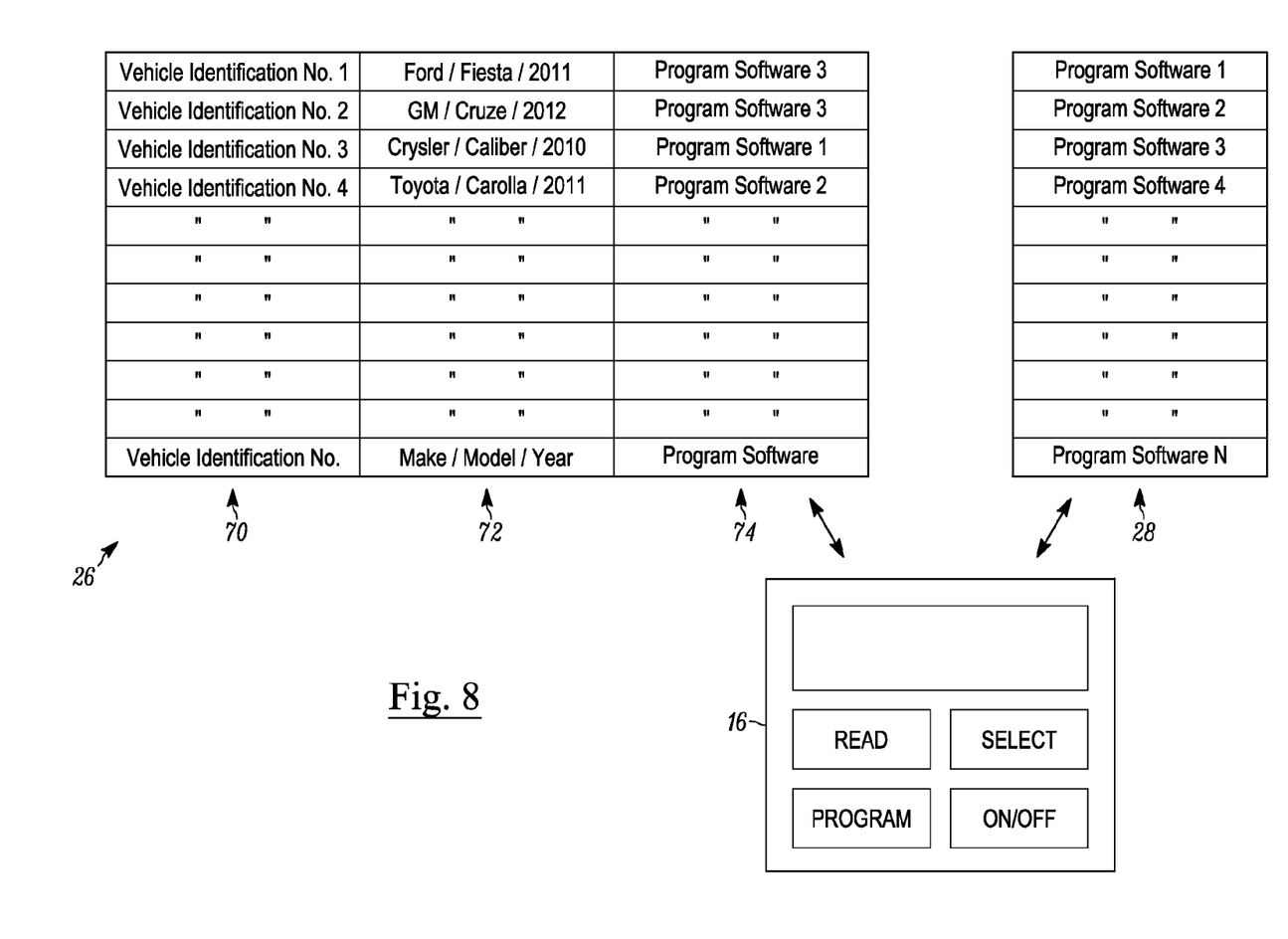
FIG. 8 illustrates a schematic view of exemplary databases of vehicle identification codes and TPMS sensor program software in communication with a hand-held programming tool according to the teachings of the present invention.

In greater detail, referring to FIG. 8, exemplary configuration of a database of identification codes 26 and database of program software 28 is shown, which is accessed through, in part, suitable software stored on the computer-readable memory device. The database of identification codes 26 includes a listing of all vehicle identification codes 70 used in recent history, particularly since the utilization of TPMS sensors. Each vehicle identification code includes or refers to a corresponding vehicle make, model and year 72, which further includes a reference to a suitable TPM sensor program software 74. The software stored on the computer-readable memory device compares the vehicle identification code determined by the vehicle identification code recorder 18 with the database of identification codes 26 to identify the specific make, model and year of the vehicle 72 and suitable TPM sensor program software 74. With this information, a suitable program software for a TPMS sensor is selected and downloaded from the database of program software 28 to a memory storage device of the programming tool 16. The software is then disposed on a memory storage device of one or more TPMS sensors through the programming tool 16.

Figure 9:
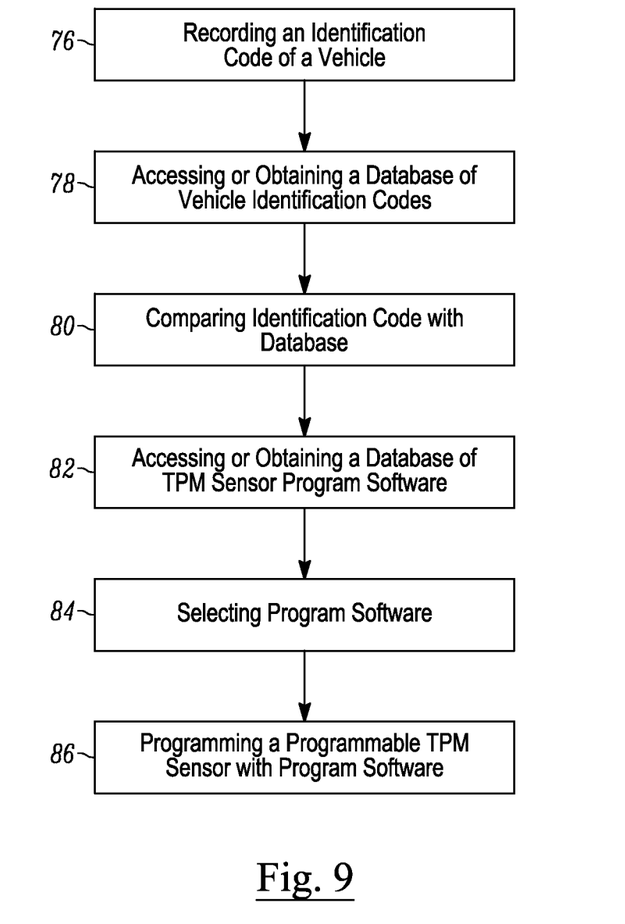
FIG. 9 illustrates a flow diagram of an exemplary method of programming a tire pressure monitoring sensor according to the teachings of the present invention.

Referring to FIG. 9, an exemplary method of programming a TPMS sensor is shown. The method includes obtaining and/or recording an identification code, or identification information, of a vehicle 76. In a first exemplary embodiment, this includes the utilization of a scanner 60, as described herein or otherwise, for capturing a bar or two-dimensional vehicle identification code 20. In second exemplary embodiment, this includes forming a communication link between an on-board diagnostic system 46 of a vehicle 22, such as through a programming tool 16, to obtain a vehicle identification code 20. In a third exemplary embodiment, this includes keying in an identification code 20 of a vehicle 22 into a programming tool 16 for a TPMS sensor 12 using a keypad 62 of the programming tool 16. Other means of determining an identification code are possible. In any regard, it is contemplated that the vehicle identification code 20 is stored in a memory device, at least temporarily, of the programming tool 16 or otherwise. In one exemplary embodiment, upon determination of the identification code 20 of a vehicle 12, the identification code is displaced on the display screen 54 of the programming tool.

In one exemplary embodiment, the step of determining an identification code 20 includes pressing a button, such as 'Record' button 50, of a programming tool 16. In this embodiment, upon pressing of the 'Record' button: i) the scanner 60 begin uploading the bar code, ii) a signal is sent to the on-board diagnostic system 46, or iii) inputted identification code typed in the programming tool 16 is analyzed.

The method further includes accessing or obtaining a database of vehicle identification codes 78. In one exemplary embodiment, this includes forming a communication link between a programming tool 16 and the database of vehicle identification codes 26. In another exemplary embodiment, this includes downloading, placing or otherwise storing the database of vehicle identification codes 26 onto the programming tool 16. Other means of accessing or obtaining a database of vehicle identification codes may be possible.

The method further includes the step of comparing the vehicle identification code with the database of vehicle identification codes 80. This step includes comparing the determined identification code 20 with the database of vehicle identifications codes 26 to further determine the make, model and year of the vehicle. In one exemplary embodiment, the operating software of the programming tool 16 compares the stored identification code 20 obtained from the vehicle 22 with the database of vehicle identification codes 26 to determine a suitable TPMS sensor operating software. In one exemplary embodiment, the particular make, model and year of the vehicle is displayed on a display screen 54 of the programming tool 16.

The method further includes the step of accessing or obtaining a database of TPMS sensor program software 82. In one exemplary embodiment, this includes forming a communication link between a programming tool 16 and the database of TPMS sensor program software 28. In another exemplary embodiment, this includes downloading, placing or otherwise storing the database of TPMS sensor program software 28 onto the programming tool 16. Other means of accessing or obtaining a database of vehicle identification codes may be possible.

The method further includes the step of selecting a suitable TPMS sensor operating software 84. The operating software of the programming tool 16 selects and/or downloads the suitable operating software, which may optimally be stored on a memory device of the programming tool. In one exemplary embodiment, selecting of the suitable TPMS sensor program software includes pressing a button, such as a 'Select' button 56 of the programming tool. Upon reviewing the vehicle identification number 20 on the display screen 54 of the programming tool 16, the user selects the vehicle identification number.

The method further includes the step of programming a programmable TPMS sensor 22 with the program software 86. In one exemplary embodiment, this includes the step of forming a wired or wireless connection 59 with a TPMS sensor 12. In one exemplary embodiment, programming of the suitable TPMS sensor includes pressing a button, such as a 'Program' button 58 of the programming tool 16. Upon pressing the program command, suitable software of the programming tool 16 transmits the selected program software to the TPMS sensor 12.

It should appreciated that additional steps, as shown and described herein, may also be included in the exemplary methods of the present invention. Further, the order of steps shown in FIG. 9 and described herein may be altered.

While the invention has been described with reference to a preferred embodiment it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method of programming a tire pressure monitoring sensor of a vehicle wheel unit, comprising the steps of:
   storing, in a hand-held programming tool, a database of identification codes, wherein the database of identification codes includes a plurality of vehicle identification numbers (VINs), wherein each of the plurality of VINs includes an associated make, model, or year of a vehicle, and wherein each of the plurality of VINs includes a reference to a program software associated with one or more of the make, the model, or the year of the vehicle;

storing, in the hand-held programming tool, a database of program software, wherein the database of program software includes a plurality of program software modules, and wherein each of the plurality of program software modules is identified by a selected reference from the database of identification codes;

linking, by the hand-held programming tool, at least some of the plurality of program software modules to a manufacturer's database;

periodically updating selected ones of the plurality of program software modules from the manufacturer's database;

obtaining a first identification information of a vehicle with the hand-held programming tool for a tire pressure monitoring sensor of a vehicle wheel unit, wherein the first identification information of the vehicle is in an electronic form;

automatically retrieving a second identification information from the database of identification codes, wherein the second identification information is in an electronic form;

automatically comparing the first identification information of the vehicle with the second identification information to determine, from the database of identification codes, one or more of a make, a model, or a year of the vehicle;

selecting and obtaining a selected one of the plurality of program software modules associated with one or more of the make, the model, or the year of the vehicle from the database of program software using the reference; and automatically programming the tire pressure monitoring sensor of the vehicle wheel unit with the selected one of the plurality of program software modules via a communication link that exists between the hand-held programming tool and the tire pressure monitoring sensor of the vehicle wheel unit.

2. The method of claim 1, wherein the step of obtaining the first identification information of the vehicle includes scanning a bar code that is representative of the first identification information of the vehicle.

3. The method of claim 2, wherein the hand-held programming tool is in communication with a separately formed scanner.

4. The method of claim 1, wherein the step of obtaining the first identification information of the vehicle includes downloading the first identification information of the vehicle from an on-board diagnostic system of the vehicle.

5. The method of claim 4, wherein the hand-held programming tool is connected to an on-board diagnostic connector of the on-board diagnostic system of the vehicle.

6. The method of claim 1, wherein the step of obtaining the first identification information of the vehicle includes manual entry of the first identification information of the vehicle into the hand-held programming tool.

7. The method of claim 1, wherein the program software includes operation commands and transmission protocols for the tire pressure monitoring sensor of the vehicle wheel unit.

8. The method of claim 1, wherein the tire pressure monitoring sensor of the vehicle wheel unit is programmed through a wired connection formed between the tire pressure monitoring sensor of the vehicle wheel unit and the hand-held programming tool.

9. The method of claim 1, wherein the tire pressure monitoring sensor of the vehicle wheel unit is programmed through a wireless connection formed between the tire pressure monitoring sensor of the vehicle wheel unit and the hand-held programming tool.

10. A tire pressure monitoring sensor of a vehicle wheel unit programmed according to the method of claim 1.

11. A programming system for a tire pressure monitoring sensor of a vehicle wheel unit, comprising:

an electronic vehicle identification code reader configured to electronically obtain a scanned vehicle identification code of a vehicle for a tire pressure monitoring sensor of a vehicle wheel unit;

a hand-held programming tool, wherein the hand-held programming tool includes a database of identification codes, wherein the database of identification codes includes a plurality of vehicle identification numbers (VINs), wherein each of the plurality of VINs includes an associated make, model, or year of a vehicle, and wherein each of the plurality of VINs includes a reference to a program software associated with one or more of the make, the model, or the year of the vehicle;

wherein the hand-held programming tool further includes a database of program software, wherein the database of program software includes a plurality of program software modules, and wherein each of the plurality of program software modules is identified by a selected reference from the database of identification codes; and wherein the hand-held programming tool links at least some of the plurality of program software modules and a manufacturer's database such that selected ones of the plurality of program software modules are periodically updated from the manufacturer's database; and a processing device configured to automatically execute software instructions to:

obtain the scanned vehicle identification code of the vehicle with the electronic vehicle identification code reader for the tire pressure monitoring sensor of the vehicle wheel unit, wherein the scanned vehicle identification code of the vehicle is in an electronic form, automatically retrieve an identification information from the database of identification codes, wherein the identification information is in an electronic form, automatically compare the scanned vehicle identification code of the vehicle with the identification information to determine, from the database of identification codes, one or more of a make, a model, or a year of the vehicle, select and obtain a selected one of the plurality of program software modules associated with one or more of the make, the model, or the year of the vehicle from the database of program software using the reference, and automatically program the tire pressure monitoring sensor of the vehicle wheel unit with the selected one of the plurality of program software modules via a communication link that exists between the hand-held programming tool and the tire pressure monitoring sensor of the vehicle wheel unit.

12. The programming system of claim 11, wherein the electronic vehicle identification code reader is disposed with the hand-held programming tool.

13. The programming system of claim 11, wherein the electronic vehicle identification code reader is separately formed and in communication with the hand-held programming tool.

14. The programming system of claim 11, wherein the processing device is disposed at the hand-held programming tool.

15. The programming system of claim 11, wherein the electronic vehicle identification code reader includes a bar code scanner that is connected to a digital memory device configured to receive and store the scanned vehicle identification code of the vehicle.

16. The programming system of claim 11, wherein the electronic vehicle identification code reader includes an on-board diagnostic connector that is connected to a digital memory device configured to receive and store the scanned vehicle identification code of the vehicle.

17. The programming system of claim 11, wherein the electronic vehicle identification code reader includes a keypad that is connected to a digital memory device configured to receive and store the scanned vehicle identification code of the vehicle.

18. The programming system of claim 11, wherein the programming system for the tire pressure monitoring sensor of the vehicle wheel unit is integrated into a single hand-held device.

19. A hand-held programming tool for programming a tire pressure monitoring sensor of a vehicle wheel unit, the hand-held programming tool comprising:
    an electronic vehicle identification code reader configured to electronically obtain a scanned vehicle identification code of a vehicle for a tire pressure monitoring sensor of a vehicle wheel unit;
    a database of identification codes, wherein the database of identification codes includes a plurality of vehicle identification numbers (VINs), wherein each of the plurality of VINs includes an associated make, model, or year of a vehicle, and wherein each of the plurality of VINs includes a reference to a program software associated with one or more of the make, the model, or the year of the vehicle;
    a database of program software, wherein the database of program software including a plurality of program software modules, and wherein each of the plurality of program software modules is identified by a selected reference from the database of identification codes;
    one or more linkages between at least some of the plurality of program software modules and a manufacturer's database such that selected ones of the plurality of program software modules are periodically updated from the manufacturer's database;
    a control unit coupled to the electronic vehicle identification code reader, the database of identification codes, and the database of program software, wherein the control unit is configured to:
        obtain the scanned vehicle identification code of the vehicle with the electronic vehicle identification code reader for the tire pressure monitoring sensor of the vehicle wheel unit, wherein the scanned vehicle identification code of the vehicle is in an electronic form,
        automatically retrieve an identification information from the database of identification codes, wherein the identification information is in an electronic form,
        automatically compare the scanned vehicle identification code of the vehicle with the identification information to determine, from the database of identification codes, one or more of a make, a model, or a year of the vehicle, and
        select and obtain a selected one of the plurality of program software modules associated with one or more of the make, the model, or the year of the vehicle from the database of program software using the reference; and
    a programming device coupled to the control unit, wherein the programming device is configured to program the tire pressure monitoring sensor of the vehicle wheel unit with the selected one of the plurality of program software modules via a communication link that exists between the hand-held programming tool and the tire pressure monitoring sensor of the vehicle wheel unit.

20. The hand-held programming tool of claim 19, wherein the electronic vehicle identification code reader includes a scanner suitable for reading a bar code.

21. The hand-held programming tool of claim 19, wherein the electronic vehicle identification code reader includes an on-board diagnostic connector for receiving the scanned vehicle identification code of the vehicle.

22. The hand-held programming tool of claim 19, wherein the electronic vehicle identification code reader includes a keypad configured to receive and store a keyed identification code.

23. The hand-held programming tool of claim 19, wherein the programming device forms a communication link with the tire pressure monitoring sensor of the vehicle wheel unit, and wherein the control unit causes the programming device to program the tire pressure monitoring sensor of the vehicle wheel unit through the communication link.

24. The hand-held programming tool of claim 23, wherein the communication link includes a wireless connection.

25. A non-transitory computer-readable memory device storing computer program instructions which, when executed by a computer comprising at least one processor, results in:
    storing, in a hand-held programming tool, a database of identification codes, wherein the database of identification codes includes a plurality of vehicle identification numbers (VINs), wherein each of the plurality of VINs includes an associated make, model, or year of a vehicle, and wherein each of the plurality of VINs includes a reference to a program software associated with one or more of the make, the model, or the year of the vehicle;
    storing, in the hand-held programming tool, a database of program software, wherein the database of program software includes a plurality of program software modules, and wherein each of the plurality of program software modules is identified by a selected reference from the database of identification codes;
    linking, by the hand-held programming tool, at least some of the plurality of program software modules to a manufacturer's database;
    periodically updating selected ones of the plurality of program software modules from the manufacturer's database;
    obtaining a first identification information of a vehicle with the hand-held programming tool for a tire pressure monitoring sensor of a vehicle wheel unit, wherein the first identification information of the vehicle is in an electronic form;
    automatically retrieving a second identification information from the database of identification codes, wherein the second identification information is in an electronic form;
    automatically comparing the first identification information of the vehicle with the second identification information to determine, from the database of identification codes, one or more of a make, a model, or a year of the vehicle;
    selecting and obtaining a selected one of the plurality of program software modules associated with one or more of the make, the model, or the year of the vehicle from the database of program software using the reference; and automatically programming the tire pressure monitoring sensor of the vehicle wheel unit with the selected one of the plurality of program software modules via a communication link that exists between the hand-held programming tool and the tire pressure monitoring sensor of the vehicle wheel unit.

26. The non-transitory computer-readable memory device of claim 25, further resulting in generating a communication link with the tire pressure monitoring sensor of the vehicle wheel unit.

27. The non-transitory computer-readable memory device of claim 25, further resulting in retrieving a bar code to determine a vehicle identification code of the vehicle.

28. The non-transitory computer-readable memory device of claim 25, further resulting in retrieving a vehicle identification code of the vehicle from an on-board diagnostic system of the vehicle.

29. The non-transitory computer-readable memory device of claim 25, further resulting in retrieving a vehicle identification code of the vehicle typed into a keypad.

30. The non-transitory computer-readable memory device of claim 25, wherein the communication link with the tire pressure monitoring sensor of the vehicle wheel unit comprises a wireless link.

31. The non-transitory computer-readable memory device of claim 25, wherein the non-transitory computer-readable memory device is stored within the hand-held programming tool.

* * * * *